United States Patent
Li et al.

(10) Patent No.: US 11,966,118 B2
(45) Date of Patent: Apr. 23, 2024

(54) COLOR-FILTER-LESS LIQUID CRYSTAL DISPLAY DEVICE, DISPLAY CONTROL DEVICE AND DISPLAY CONTROL METHOD THEREOF

(71) Applicants: Beijing BOE Optoelectronics Technology Co., Ltd., Beijing (CN); BOE Technology Group Co., Ltd., Beijing (CN)

(72) Inventors: Pengtao Li, Beijing (CN); Rui Han, Beijing (CN); Xiaoxia Wang, Beijing (CN); Jie Yu, Beijing (CN); Qing Ma, Beijing (CN); Daekeun Yoon, Beijing (CN); Weining Chi, Beijing (CN); Li Tian, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,154

(22) PCT Filed: Jun. 11, 2021

(86) PCT No.: PCT/CN2021/099708
§ 371 (c)(1),
(2) Date: Jun. 24, 2022

(87) PCT Pub. No.: WO2022/022108
PCT Pub. Date: Feb. 3, 2022

(65) Prior Publication Data
US 2022/0397798 A1    Dec. 15, 2022

(30) Foreign Application Priority Data
Jul. 31, 2020  (CN) .......................... 202010756128.6

(51) Int. Cl.
*G02F 1/1335*   (2006.01)
*G02F 1/1362*   (2006.01)
(Continued)

(52) U.S. Cl.
CPC .. *G02F 1/133612* (2021.01); *G02F 1/133607* (2021.01); *G02F 1/133622* (2021.01);
(Continued)

(58) Field of Classification Search
CPC ....... G02F 1/1335; G02F 1/1362; G09G 3/34; G09G 3/36
See application file for complete search history.

(56) References Cited

U.S. PATENT DOCUMENTS

2001/0038371 A1 * 11/2001 Yoshinaga ........... G09G 3/3413
345/87
2006/0050047 A1    3/2006 Jin et al.
(Continued)

FOREIGN PATENT DOCUMENTS

| CN | 1628262 A | 6/2005 |
|---|---|---|
| CN | 101739984 A | 6/2010 |

(Continued)

OTHER PUBLICATIONS

PCT/CN2021/099708 international search report and written opinion.

*Primary Examiner* — Kwang-Su Yang
(74) *Attorney, Agent, or Firm* — IPro, PLLC (57) ABSTRACT

A display device includes: a plurality of backlight modules, where each backlight module includes a plurality of light sources capable of emitting light in at least three different colors; a color-filter-less liquid crystal display module including a plurality of pixel units arranged in an array form and a plurality of scanning lines coupled to the pixel units; where the plurality of backlight modules are arranged in
(Continued)

parallel with the liquid crystal display module; where an orthogonal projection of each backlight module onto a plane where the liquid crystal display module is located corresponds to at least two rows of pixel units, where the pixel units in one row are along an length extension direction of each scanning line; and a driving circuit coupled to each backlight module and configured to apply a backlight driving signal to each backlight module.

14 Claims, 6 Drawing Sheets

(51) Int. Cl.
    *G09G 3/34* (2006.01)
    *G09G 3/36* (2006.01)
    *G02F 1/13357* (2006.01)

(52) U.S. Cl.
    CPC ..... *G02F 1/136286* (2013.01); *G09G 3/3413* (2013.01); *G09G 3/3426* (2013.01); *G09G 3/3648* (2013.01); *G02F 1/133605* (2013.01); *G02F 2203/34* (2013.01); *G09G 2320/0626* (2013.01); *G09G 2320/0666* (2013.01)

(56) References Cited

U.S. PATENT DOCUMENTS

| | | | |
|---|---|---|---|
| 2007/0230207 A1* | 10/2007 | Shin | G09G 3/342 362/561 |
| 2007/0291198 A1* | 12/2007 | Shen | G09G 3/3413 349/69 |
| 2008/0284714 A1 | 11/2008 | Wu et al. | |
| 2011/0134021 A1 | 6/2011 | Schmitz et al. | |
| 2012/0075555 A1* | 3/2012 | Parker | G02B 6/008 349/62 |
| 2013/0120467 A1* | 5/2013 | Hou | G09G 3/3666 345/88 |
| 2013/0201424 A1* | 8/2013 | Uchida | G02F 1/133606 349/64 |
| 2018/0003883 A1* | 1/2018 | Zhu | G02B 6/0031 |

FOREIGN PATENT DOCUMENTS

| | | |
|---|---|---|
| CN | 102087834 A | 6/2011 |
| CN | 202394504 U | 8/2012 |
| JP | 2000122026 A | 4/2000 |
| TW | 200844944 A | 11/2008 |

\* cited by examiner

COLOR-FILTER-LESS LIQUID CRYSTAL DISPLAY DEVICE, DISPLAY CONTROL DEVICE AND DISPLAY CONTROL METHOD THEREOF

CROSS REFERENCE TO RELATED APPLICATIONS

This application is the U.S. national phase of PCT Application No. PCT/CN2021/099708 filed on Jun. 11, 2021, which claims priority to Chinese Patent Application No. 202010756128.6 filed on Jul. 31, 2020, which is incorporated by reference herein in its entirety.

TECHNICAL FIELD

The present disclosure relates to the field of display technology, in particular to a display device, a display control method and a display control device.

BACKGROUND

At present, it is a research focus to reduce power consumption in a liquid crystal display technology. A color-filter-less display becomes one of technical manners in the current liquid crystal display technology to achieve the above-mentioned technical effects. Since there is no color filter, the quantity of sub-pixels is one third of the quantity of sub-pixels in a conventional display substrate having a color filter, the light transmittance increases and the power consumption may be adequately reduced. However, due to such issues as low brightness and serious crosstalk, it is even impossible for the color-filter-less display to be applied to practical applications.

SUMMARY

A display device is provided, including: a plurality of backlight modules, where each backlight module includes a plurality of light sources capable of emitting light in at least three different colors; a color-filter-less liquid crystal display module including a plurality of pixel units arranged in an array form and a plurality of scanning lines coupled to the pixel units; where the plurality of backlight modules are arranged in parallel with the liquid crystal display module; where an orthogonal projection of each backlight module onto a plane where the liquid crystal display module is located corresponds to at least two rows of pixel units, where the pixel units in one row are along an length extension direction of each scanning line; and a driving circuit coupled to each backlight module and configured to apply a backlight driving signal to each backlight module.

In a possible embodiment of the present disclosure, the plurality of backlight modules are arranged in a direction perpendicular to the length extension direction of the scanning line.

In a possible embodiment of the present disclosure, the display device further includes: a signal processor, configured to output a control sequence where the light sources emit light in different colors. The driving circuit is coupled to the signal processor, and configured to apply the backlight driving signal to the backlight modules in accordance with the control sequence, to enable the plurality of light sources to emit light in a corresponding color.

In a possible embodiment of the present disclosure, each of the backlight module further includes: signal lines corresponding to different colors of light, wherein the light sources in the backlight module emitting light in different colors are each coupled to the driving circuit via a corresponding signal line.

In a possible embodiment of the present disclosure, the driving circuit includes: a driving chip, each backlight module is coupled to the driving chip via the signal lines, and the driving chip is configured to apply the backlight driving signal to the coupled backlight module. Different backlight modules are coupled to one driving chip, or, different backlight modules are coupled to different driving chips respectively, or, there are at least two driving chips, and each driving chip is coupled to a part of the backlight modules.

In a possible embodiment of the present disclosure, a switch element is arranged at each signal line; when the switch element is in an on state, the light source coupled to the signal line is electrically connected to a power source; when the switch element is in an off state, the light source coupled to the signal line is electrically disconnected from the power source. The driving circuit includes: a switch controller coupled to each switch element and configured to apply a switch control signal to the switch element to enable the switch element to switch between the on state and the off state, where the backlight driving signal is applied to different backlight modules via the switch control signal.

In a possible embodiment of the present disclosure, each backlight module further includes: a collimating structure configured to perform collimating calibration on the light emitted by the backlight module.

In a possible embodiment of the present disclosure, the collimating structure includes a cup-shaped body disposed surrounding each light source, and an interior surface of the cup-shaped body is a reflective surface.

In a possible embodiment of the present disclosure, the collimating structure includes a light shielding baffle plate disposed between two adjacent backlight modules.

A display control method applied to the above-mentioned display device is further provided, including: acquiring a target image frame data to be displayed; and applying a display scanning signal to the scanning lines of an array substrate sequentially and applying a backlight driving signal to the backlight modules in accordance with the target image frame data. When applying the display scanning signal to the scanning lines of the array substrate sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

In a possible embodiment of the present disclosure, the backlight driving signal is applied to the backlight module after the display scanning signal has been applied to the scanning lines of the corresponding pixel units for preset duration, where the preset duration is duration required for the deflection of a liquid crystal molecule.

In a possible embodiment of the present disclosure, when applying the display scanning signal to the scanning lines of the array substrate sequentially and applying the backlight driving signal to the backlight module in accordance with the target image frame data, a display input period of the target image frame data includes a plurality of input procedures of applying the display scanning signal to the scanning lines of an array substrate sequentially, the plurality of backlight modules emit light in a same color within each input procedure, and emit light in different colors within different input procedures respectively.

In a possible embodiment of the present disclosure, after the backlight driving signal is applied to the corresponding backlight module, to enable the plurality of light sources in the backlight module to emit light in one of the colors, the method further includes: when applying the display scanning signal of a next procedure to the scanning lines of the corresponding pixel units, controlling the plurality of light sources in the corresponding backlight module to be turned off.

A display control device applied to the above-mentioned display device is further provided, including: a data acquisition module, configured to acquire a target image frame data to be displayed, and a control module, configured to apply a display scanning signal to the scanning lines sequentially and apply a backlight driving signal to the backlight modules in accordance with the target image frame data. During one input procedure of applying the display scanning signal to all the scanning lines sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

BRIEF DESCRIPTION OF THE DRAWINGS

In order to illustrate the technical solutions of the embodiments of the present disclosure or the related art in a clearer manner, the drawings required for the description of the embodiments of the present disclosure will be described hereinafter briefly. Apparently, the following drawings merely relate to some embodiments of the present disclosure, and based on these drawings, a person of ordinary skill in the art may obtain other drawings without any creative effort.

DETAILED DESCRIPTION

In order to make the technical problems to be solved, the technical solutions and the advantages of the embodiments of the present disclosure more apparent, a detailed description will be given below with reference with the drawings and specific embodiments.

In the display device of the embodiments of the present disclosure, a plurality of backlight modules are provided, each backlight module is separately controlled via a driving circuit, and each backlight module corresponds to at least two rows of pixel units, where the pixel units in one row are along an length extension direction of each scanning line, so, when a display control is performed, it is able to control a region where a back light is energized and a light-emitting color in real time after the scanning and charging of pixel units, thereby to improve brightness of the color-filter-less display.

Figure 1:
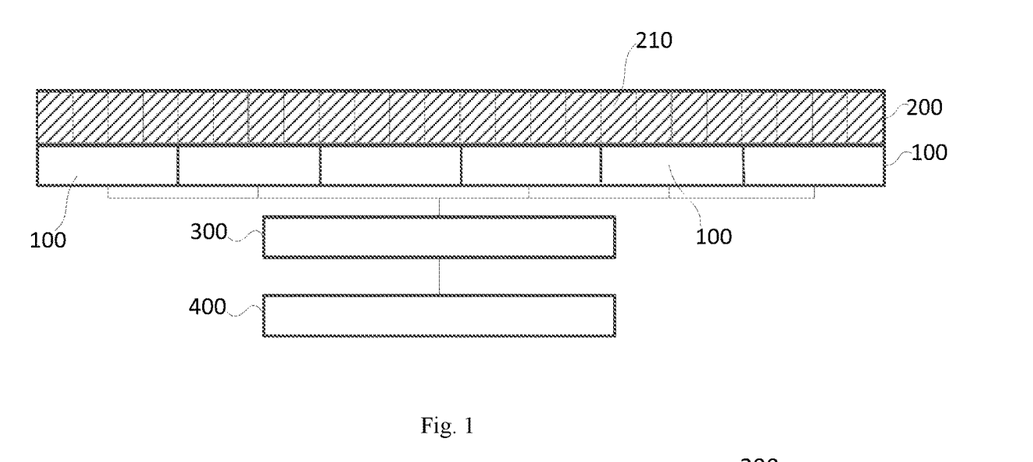
FIG. 1 is a sectional view of a display device according to one embodiment of the present disclosure.
Figure 2:
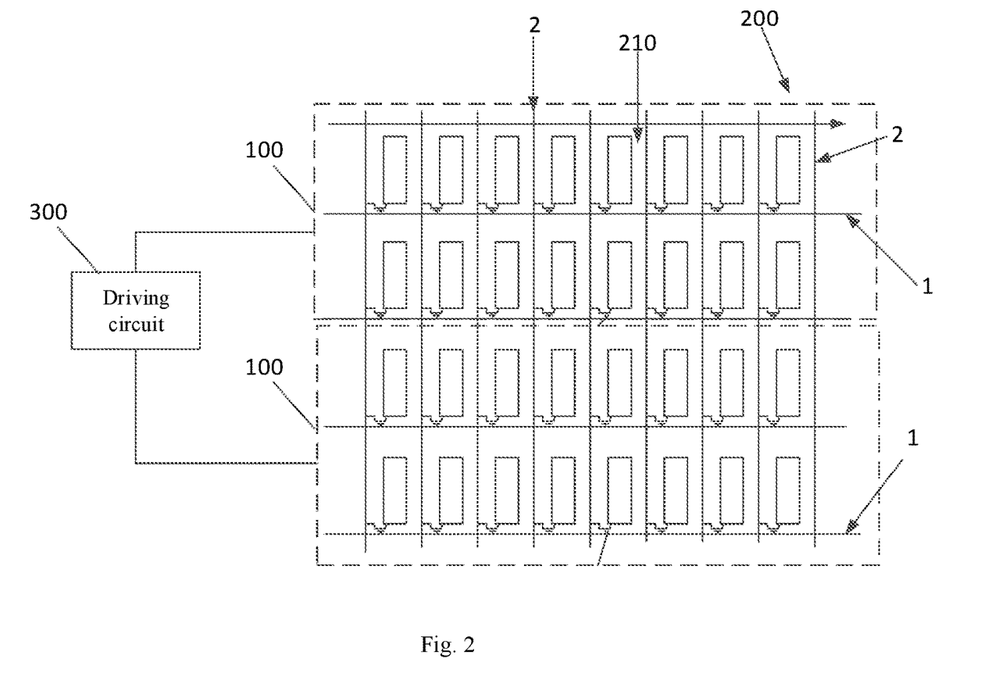
FIG. 2 is a schematic view showing partial structures of the display device according to one embodiment of the present disclosure.

FIG. 1 is a sectional view of a display device according to one embodiment of the present disclosure, and FIG. 2 is a view showing a correspondence between backlight modules and the pixel units. In the embodiments of the present disclosure, the display device includes: a plurality of backlight modules 100, where each backlight module 100 includes a plurality of light sources (not shown) capable of emitting light in at least three different colors; a color-filter-less liquid crystal display module 200, including a plurality of pixel units 210 arranged in an array form and a plurality of scanning lines 1 coupled to the pixel units 210; where the plurality of backlight modules 100 are arranged in parallel with the liquid crystal display module 200; where an orthogonal projection of each backlight module 100 onto a plane where the liquid crystal display module 200 is located corresponds to at least two rows of pixel units 210, where the pixel units in one row are along an length extension direction of each scanning line 1; and a driving circuit 300 coupled to each backlight module 100 and configured to apply a backlight driving signal to each backlight module 100.

In the embodiments of the present disclosure, the liquid crystal display module 200 is of a color-filter-less structure, and includes a display panel and an array substrate. The display panel includes two substrates arranged opposite to each other to form a cell, a liquid crystal layer arranged between the two substrates and a polarizer arranged at a light-exiting side. The scanning lines and data lines which cross each other are arranged on the array substrate, a plurality of pixel units is arranged in regions surrounded by the scanning lines and the data lines that cross each other, and a thin-film transistor and a pixel electrode are arranged corresponding to each pixel unit. In addition, a common electrode wire, an alignment film, a black matrix and the like are further arranged on the array substrate.

As shown in FIG. 2, the scanning line 1 and the data line 2 are coupled to each thin-film transistor and each pixel electrode, a display driving chip applies a control signal to the scanning line to control the thin-film transistor to be turned on or off, and applies a voltage driving signal for image display to the data line, to generate a voltage between the pixel electrode and the common electrode, so as to enable a liquid crystal molecule to be deflected, thereby to allow the incident light arriving the liquid crystal layer to pass through and be used for the image display. Specifically, the control signal is applied to the scanning lines progressively in a row-by-row manner, when the control signal is applied to each scanning line, a data signal is applied to the data lines, so as to finish the input of one frame.

In the embodiments of the present disclosure, since there is no color filter in the liquid crystal display module 200, when the incident light arrives the display panel, it is able to adjust the display brightness of the output light without changing the color of the light through controlling a deflection state of the liquid crystal molecule.

In order to enable the color-filter-less liquid crystal display module 200 to display a colored image, in the display device of the embodiments of the present disclosure, the plurality of backlight modules 100 are controlled in a time-division multiplexing manner to emit the light in at least three colors, such as three primary colors of red, green and blue, sequentially. In addition, a switch control signal is applied to the scanning lines coupled to the thin-film transistors of the pixel units sequentially, and a voltage driving signal is applied to the data lines, so as to turn on liquid crystal optical shutters in an intensity required for the pixel units in the corresponding color through the thin-film transistors, thereby to form a colored video image through the light in at least three colors emitted sequentially. It should be appreciated that, when it is ensured that a period where the light in at least three colors is emitted sequentially is less than duration of vision, it is able to form a colored image in a human brain, thereby to enable a viewer to see the display effect of the colored image.

Actually, the duration of vision is a field frequency period of a television, i.e., one sixtieth of a second, so it is required that images in at least three colors, e.g., red, green and blue, have been displayed on the display device within one sixtieth of a second.

In the display device of the embodiments of the present disclosure, the backlight module 100 may emit the light in different colors which enter the liquid crystal display module 200 in accordance with the timing sequence, and in combination with controlling a state of the liquid crystal molecule of the liquid crystal display module 200, it is able to achieve the colored image display without a color filter. In the embodiments of the present disclosure, there are multiple backlight modules 100, and the driving circuit 300 is coupled to each backlight module 100, so as to apply the backlight driving signal to each backlight module 100, thereby to enable the plurality of light sources of the backlight module 100 to emit light in one color at a same time point.

Taking the backlight module 100 including the light sources in three primary colors of red, green and blue as an example, the backlight module 100 emits light in different colors sequentially for the colored image display of the liquid crystal display module 200. For example, in combination with a driving manner shown in FIG. 4, an $n^{th}$ red driving signal is applied to drive the liquid crystal molecules of pixel units, and then red light sources of the backlight module emit light. An $(n+1)^{th}$ green driving signal is applied to drive the liquid crystal molecules of the pixel units, and then green light sources of the backlight module emit light. An $(n+2)^{th}$ blue driving signal is applied to drive the liquid crystal molecules of the pixel units, and then blue light sources of the backlight module emit light. The above three times form a cycle, and a same pixel unit on the liquid crystal layer is driven in a time-division manner, so as to obtain the mixed color effect of the three colors and present the colored image.

In the related art, when displaying an image, light sources of the entire backlight module 100 are controlled at the same time. When a red driving signal is applied, red light sources of the entire backlight module 100 emit light at the same time, and scanning lines of the liquid crystal display module 200 are scanned progressively to change grayscales of pixels in each row. After one frame has been scanned, a green driving signal is applied, green light sources of the entire backlight module 100 emit light at the same time, and the scanning lines of the liquid crystal display module 200 are scanned progressively to change grayscales of the pixels in each row. Based on the above, similar inputting and controlling procedures are performed.

In the above-mentioned control method, when the red light sources of the backlight module 100 are energized, not the pixel units in each row correspond to a red grayscale. As a result, when the above-mentioned scanning manner is used sequentially, serious crosstalk occurs. In the related art, it is proposed that a black state is inserted between two adjacent colors, i.e., the backlight module 100 is in a full black state for preset duration before the light sources in a next color are energized, so as to mitigate the crosstalk due to the change of the grayscale.

Figure 3:
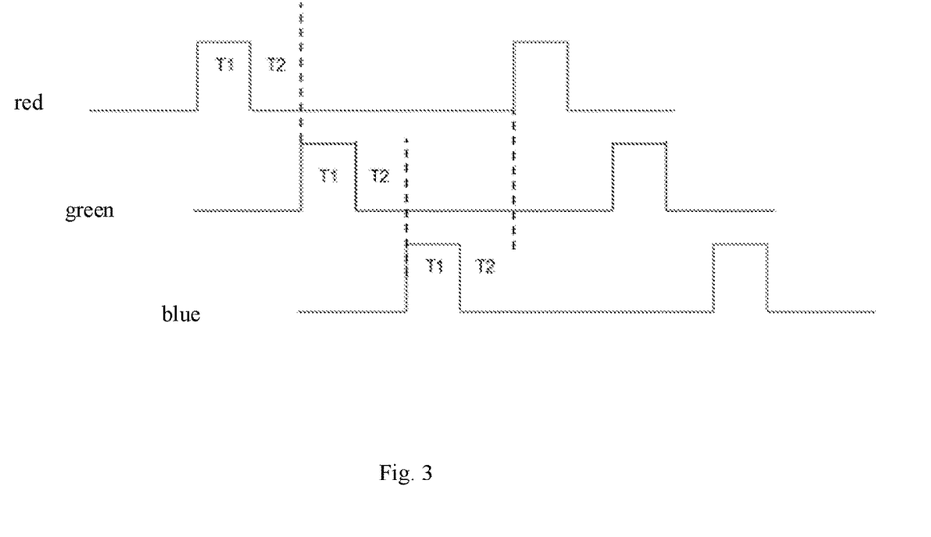
FIG. 3 is a timing sequence diagram of a conventional case where a backlight module emits light and scanning lines of a liquid crystal display module are scanned.

Referring to FIG. 3, taking a case where the backlight module 100 includes the light sources in three primary colors of red, green and blue as an example, when the backlight module 100 is controlled to emit light in red, green and blue sequentially, corresponding to a light-emitting timing sequence of each color, there are two time stages, i.e., a first time stage T1 and a second time stage T2, for the liquid crystal display module 200. T1, which is in a black state, is a sum of a scanning and charging time period of the scanning lines corresponding to the light sources in each color and a liquid crystal deflection time period. T2 is a time period when the light sources in the corresponding color are in a light-emitting state. Only when the first time stage T1 is finished, the second time stage occurs, and the backlight module 100 emits light in a corresponding color, so as to avoid crosstalk. Therefore, in a same refresh frequency of the display device, when increasing the duration of T2, it is able to increase the effective light-emitting duration of the backlight module 100, thereby to improve the brightness of the display device.

However, in the above-mentioned solution for addressing the issue of the crosstalk in the related art, due to the insertion of the black state, not only the brightness is reduced, but also the display refresh frequency is reduced, so other defects such as flicker occur. Therefore, it is necessary to provide an effective solution to address the issue of low brightness and severe crosstalk in the color-filter-less display.

In the display device of the embodiments of the present disclosure, the plurality of backlight modules is provided, each backlight module is separately controlled by the driving circuit. Each backlight module corresponds to at least two rows of pixel units of the liquid crystal display module, where the pixel units in one row are along the length extension direction of each scanning line, so after a part of the scanning lines of the liquid crystal display module 200 has been scanned, the light sources of the corresponding backlight module 100 are energized. In other words, the scanning process and the light-emitting process of the light sources of the backlight module 100 are performed in a stage-division and matching manner. As compared with a case where the light sources of the backlight module 100 are energized after scanning the scanning lines of the entire liquid crystal display module 200, it is able to increase the effective light-emitting duration of the backlight module 100, and increase the brightness of the entire display device.

In order to clearly illustrate a light-emitting driving process of the display device in the embodiments of the present disclosure, a structure of the display device will be described below in detail.

Referring to FIG. 2, in the embodiments of the present disclosure, a plurality of backlight modules 100 are arranged along a direction perpendicular to the length extension direction of the scanning line 1, i.e., along a direction parallel to the data line 2, and the orthogonal projection of each backlight module 100 onto the plane where the liquid crystal display module 200 is located corresponds to at least two rows of pixel units 210, where the pixel units in one row are along the length extension direction of the scanning line 1.

In a possible embodiment of the present disclosure, each backlight module 100 includes M×N light sources, M and N are each a positive integer, and M×N light sources are arranged in directions along the scanning line 1 and the data line 2. In the embodiments of the present disclosure, the numerical values of M and N are not particularly defined, and are determined according to the structural arrangement requirements of the display device.

In a possible embodiment of the present disclosure, each light source in each backlight module 100 may be a Light-Emitting Diode (LED), an Organic Light-Emitting Diode (OLED), a Quantum Dot Light Emitting Diode (QLED), a micro-LED or a Mini-LED, and each light source is configured to emit monochromatic light of red, green or blue, i.e., each light source is one of a red light source, a green light source or a blue light source. One backlight module 100 includes at least the above-mentioned three kinds of light sources. In another embodiment of the present disclosure, backlight module 100 includes one kind of light source that is capable of emitting red, green, or blue light through controlling.

In a possible embodiment of the present disclosure, the quantities of the light sources in the plurality of backlight modules 100 may be the same or different.

In the embodiments of the present disclosure, optionally, as shown in FIG. 1, the display device further includes: a signal processor 400, configured to output a control sequence where the light sources emit light in different colors. The driving circuit 300 is coupled to the signal processor 400, and configured to apply the backlight driving signal to the backlight modules in accordance with the control sequence, to enable the plurality of light sources to emit light in a corresponding color.

In a possible embodiment of the present disclosure, the signal processor 400 is further configured to decompose an RGB image signal inputted externally into separate R, G and B display signals and perform data storage.

In a possible embodiment of the present disclosure, the signal processor 400 outputs the display driving signal to the driving chip of the liquid crystal display module 200 in accordance with the decomposed separate R, G and B display signals, to enable the driving chip of the liquid crystal display module 200 to apply signals to the scanning lines 1 and the data lines 2 in accordance with the display driving signal. The signal processor 400 further outputs the control sequence to the driving circuit 300, to enable the driving circuit 300 to apply the backlight driving signal to different backlight modules 100, so as to enable the light sources in different colors emit light in sequence.

Figure 4:
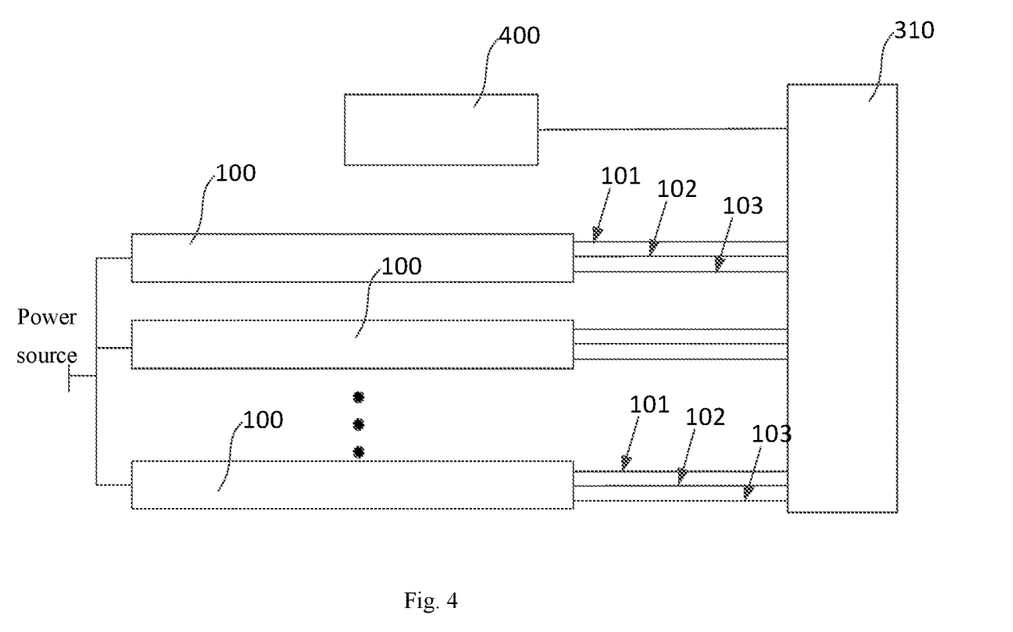
FIG. 4 is a schematic view showing a driving circuit of a backlight module in the display device according to one embodiment of the present disclosure.
Figure 5:
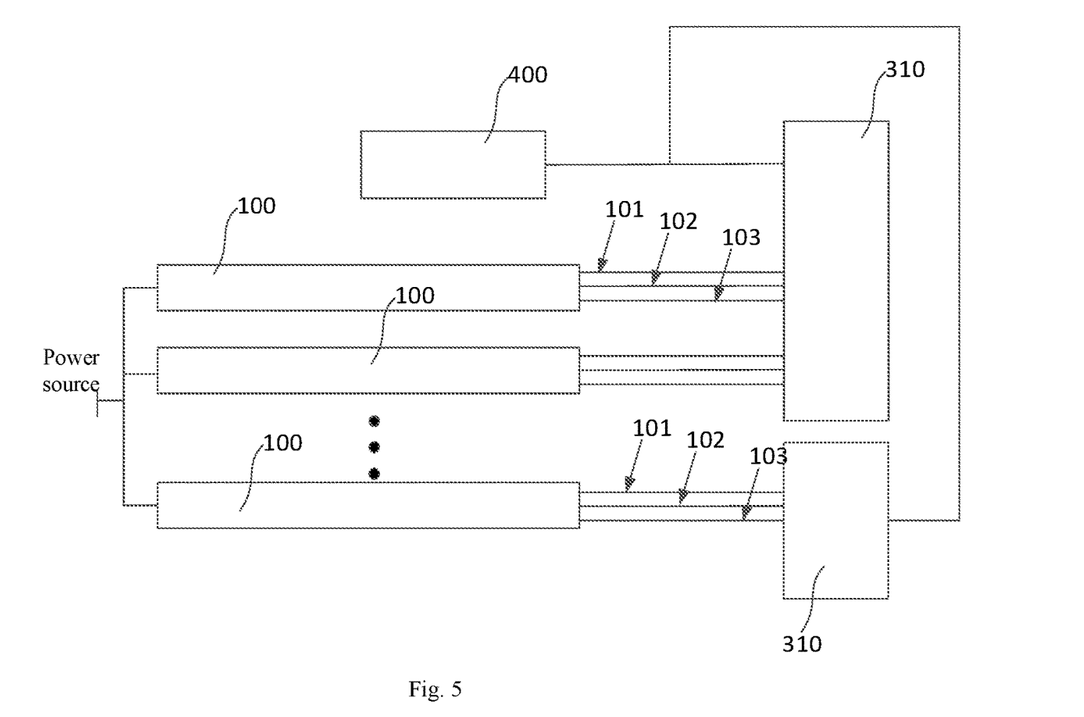
FIG. 5 is another schematic view showing the driving circuit of the backlight module in the display device according to one embodiment of the present disclosure.

Based on the above scheme, an image output process of the display device includes the procedures of image data processing, data storage, display data output and backlight control. An image to be output is parsed and decomposed through the image data processing procedure, and an RGB image data signal of each frame is stored and decomposed into separate R, G and B image data signals. Through the display output procedure, the parsed and stored R/G/B image data is outputted to a display driving circuit of the liquid crystal display module in accordance with the timing sequence, and the driving circuit of the backlight module is controlled to perform display data output and backlight control, so as to display the output image. Optionally, in the embodiments of the present disclosure, the above-mentioned functions of the image data processing, the data storage, the display data output and the backlight control may be integrated into one controller (such as the signal processor 400), or may be divided and performed by multiple processors. In one embodiment of the present disclosure, as shown in FIGS. 4 and 5, each backlight module 100 further includes: signal lines corresponding to different colors of light, where the light sources in the backlight module emitting light in different colors are each coupled to the driving circuit via a corresponding signal line.

In a possible embodiment of the present disclosure, the driving circuit includes: a driving chip 310, each backlight module 100 is coupled to the driving chip 310 via the signal lines, and the driving chip 310 is configured to apply the backlight driving signal to the coupled backlight module 100. Different backlight modules 100 are coupled to one driving chip 310, or, different backlight modules 100 are coupled to different driving chips 310 respectively, or, there are at least two driving chips 310, and each driving chip 310 is coupled to a part of the backlight modules 100.

In a possible embodiment of the present disclosure, each driving chip 310 is coupled to the signal processor 400.

Specifically, signal lines to which each backlight module 100 is coupled includes a first signal line 101 for outputting red light, a second signal line 102 for outputting green light, and a third signal line 103 for outputting blue light, each of which is coupled to one driving chip 310.

In one embodiment of the present disclosure, as shown in FIG. 4, the signal lines of each backlight module 100 are coupled to a same driving chip 310. The driving chip 310 is coupled to the signal processor 400, and controls a light-emitting sequence of the light sources in different colors of each backlight module 100 in accordance with the control sequence from the signal processor 400.

In another embodiment of the present disclosure, as shown in FIG. 5, there are at least two driving chips 310, each driving chip 310 is coupled to a part of the backlight modules 100 through the signal lines, and each driving chip 310 is coupled to the signal processor 400. The signal processor 400 inputs the control sequence to each driving chip 310, and each driving chip 310 controls the light sources in different colors of each coupled backlight module 100 to emit light in accordance with the control sequence from the signal processor 400.

Figure 6:
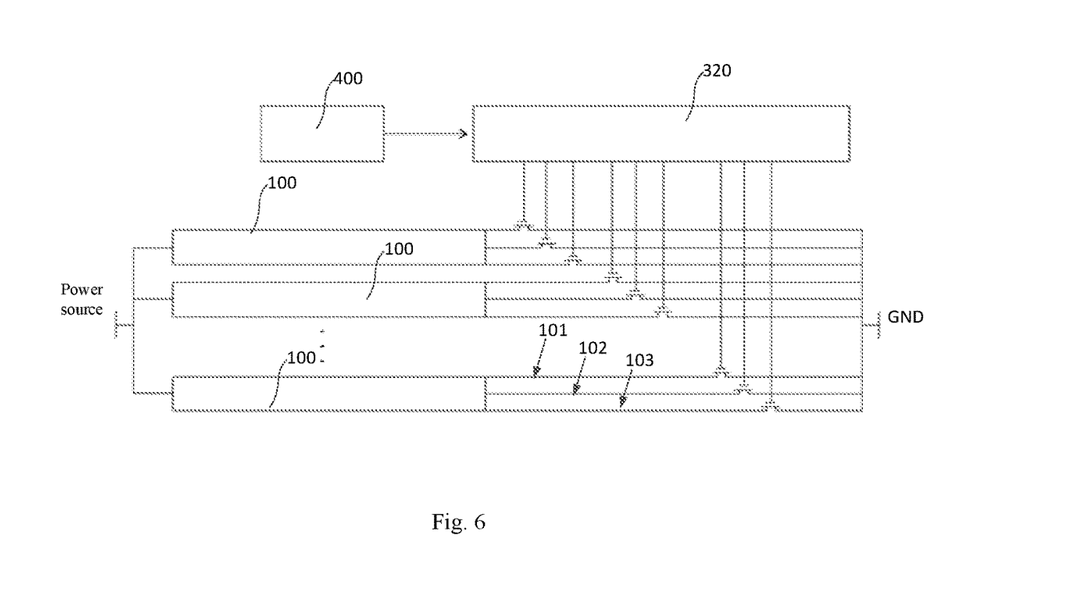
FIG. 6 is another schematic view showing the driving circuit of the backlight module in the display device according to one embodiment of the present disclosure.

In yet another embodiment of the present disclosure, as shown in FIG. 6, a switch element is arranged at each signal line. When the switch element is in an on state, the light source coupled to the signal line is electrically connected to a power source. When the switch element is in an off state, the light source coupled to the signal line is electrically disconnected from the power source. The driving circuit includes: a switch controller 320 coupled to each switch element and configured to apply a switch control signal to the switch element to enable the switch element to switch between the on state and the off state, where the backlight driving signal is applied to different backlight modules via the switch control signal Specifically, the signal lines to which each backlight module 100 is coupled includes the first signal line 101 for outputting red light, the second signal line 102 for outputting green light, and the third signal line 103 for outputting blue light, each of which is coupled to the switch controller 320 via the switch element. Each switch controller 320 is coupled to the signal processor 400, the signal processor 400 inputs the control sequence of light-emitting of different colors to the switch controller 320, in accordance with the control sequence, the switch controller 320 controls the switch elements at the corresponding color signal lines to be in an on state, and the light sources of each backlight module 100 emit light in the corresponding color.

It should be appreciated that the above-mentioned connection structures between the driving circuit 300 and the backlight modules 100 are merely examples and are not limited thereto, as long as it is able for the driving circuit 300 to control the light sources in different colors of the backlight module 100 to be energized in accordance with the preset timing sequence.

In a possible embodiment of the present disclosure, the signal processor 400 may be a Field Programmable Gate Array (FPGA) chip or a Timer Control Register (Tcon) chip.

In order to avoid the display crosstalk, in the embodiments of the present disclosure, optionally, each backlight module further includes: a collimating structure configured to perform collimating calibration on the light emitted by the backlight module.

Figure 7:
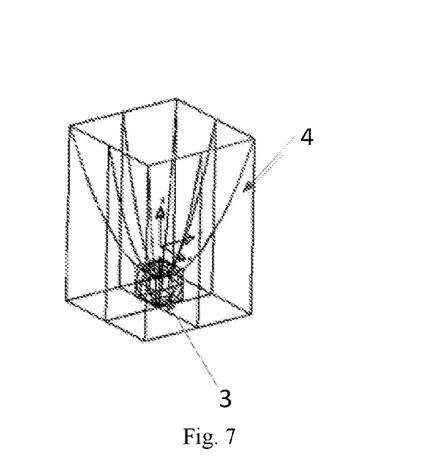
FIG. 7 is a schematic view showing the arrangement of a collimating structure according to one embodiment of the present disclosure.

Optionally, in one embodiment of the present disclosure, as shown in FIG. 7, the collimating structure includes a cup-shaped body 4 disposed surrounding each light source 3, and an interior surface of the cup-shaped body 4 is a reflective surface. In other words, four side surfaces surrounding the light source 3 are each a reflective surface. The light emitted by the light source 3 is reflected by the reflective surface, and thereby transmits in one direction, so as to achieve the effect of collimating calibration of the light.

Figure 8:
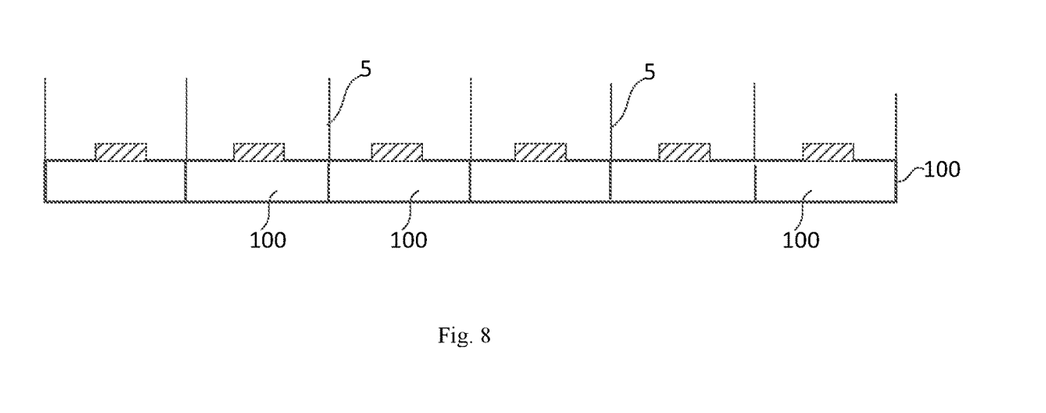
FIG. 8 is another schematic view showing the arrangement of the collimating structure according to one embodiment of the present disclosure.

Optionally, in another embodiment of the present disclosure, as shown in FIG. 8, the collimating structure includes a light shielding baffle plate 5 arranged between two adjacent backlight modules 100.

In a possible embodiment of the present disclosure, the light shielding baffle plate 5 is provided between every two adjacent backlight modules 100, so as to prevent the light emitted by the light source of the backlight module 100 from transmitting to other regions, thereby to avoid the crosstalk.

The specific implementations of the above-mentioned collimating structure are merely examples, which is not particularly defined herein. For example, each backlight module 100 may be of a structure in which a collimating backlight unit is integrated with a diffusion film, so as to achieve a collimated light-emitting effect. Alternatively, the light source of each backlight module 100 is a Digital Light Processing (DLP) light source, configured to directly output collimated light.

In the display device of the embodiments of the present disclosure, there are multiple backlight modules corresponding to the liquid crystal display module, each backlight module corresponds to the pixel units in one of regions of the liquid crystal display module.

For example, as shown in FIGS. 1 and 2, when the liquid crystal display module includes 400 rows of pixel units along a length extension direction of the data line 2. In one embodiment of the present disclosure, multiple backlight modules are arranged corresponding to the entire distribution region of the pixel units. For example, 40 backlight modules are arranged sequentially along the length extension direction of the data line 2, each backlight module corresponds to 10 rows of pixel units.

Based on the above scheme, when the display scanning signal is applied to the scanning lines 1 of the array substrate sequentially during the display control, after the display scanning signal has been applied to the scanning lines of the pixel units corresponding to each backlight module 100, the backlight driving signal is applied to the corresponding backlight module 100, so as to enable the plurality of light sources in the backlight module to emit light in one of the colors.

Figure 9:
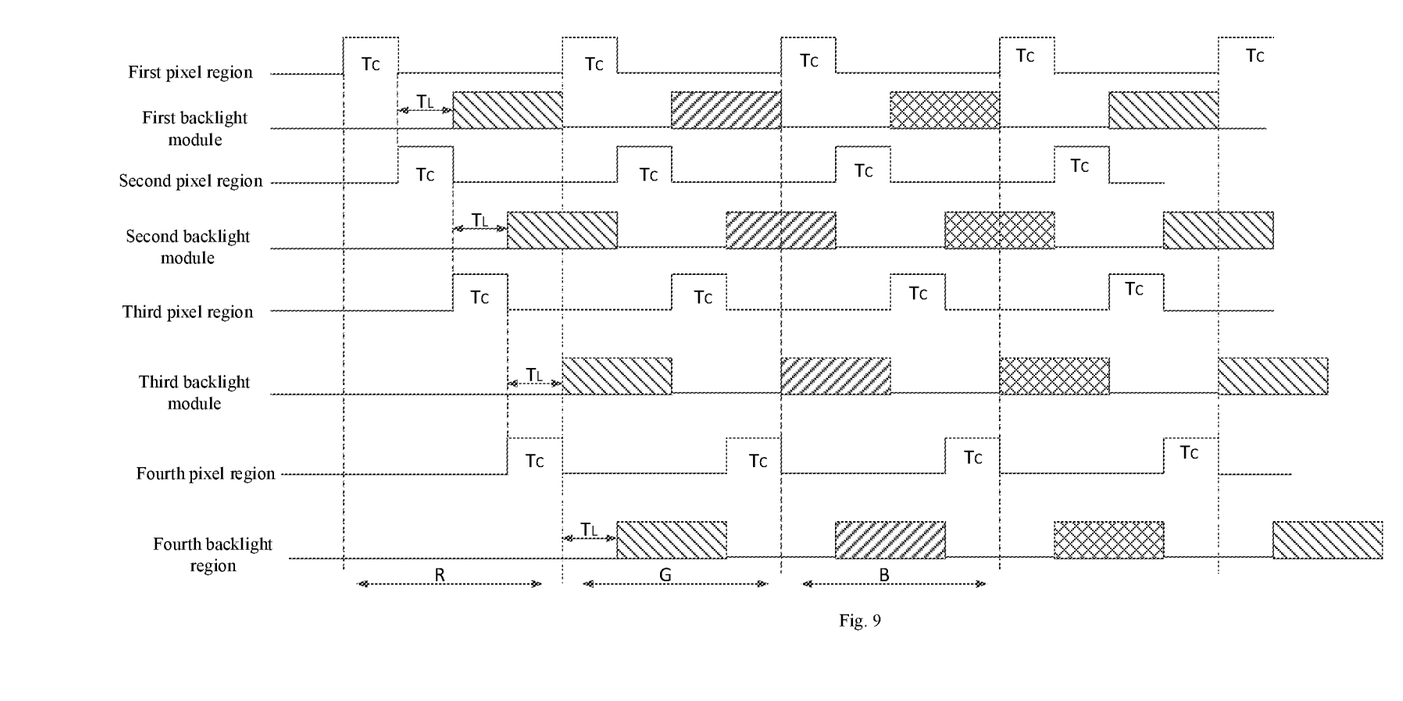
FIG. 9 is a timing sequence diagram of a case where the backlight module emits light and scanning lines of a liquid crystal display module are scanned according to one embodiment of the present disclosure.

A display driving process of the display device in the embodiments of the present disclosure is described below by taking a case where there are four backlight modules, and one backlight module corresponds to 100 rows of pixel units as an example. As shown in FIG. 9, when it starts to switch data for the display of the pixel units in a first row, the light sources of a first backlight module are turned off, and the display scanning signal is applied to the scanning lines of the pixel units in the first row to a $100^{th}$ row progressively. After the scanning of the scanning lines of the pixel units in the first row to the $100^{th}$ row and the deflection of the liquid crystal molecule of the liquid crystal layer, the backlight driving signal is applied to the first backlight module, so as to enable a plurality of light sources in the first backlight module to emit light in a same color, e.g., red light, thereby to perform the image display. Similarly, after the scanning of the scanning lines of the pixel units in a $101^{st}$ row to a $200^{th}$ row and the deflection of the liquid crystal molecule of the liquid crystal layer, the backlight driving signal is applied to a second backlight module, so as to enable a plurality of light sources in the second backlight module to emit light in a same color as the light from the first backlight module, e.g., red light, thereby to perform the image display. Similarly, the display scanning signal is applied the scanning lines of the pixel units in a $201^{st}$ row to a $400^{th}$ row progressively, and the backlight driving signal is applied to the corresponding backlight module in the above-mentioned manner until the end of one scanning period. In this regard, the scanning of all the 400 scanning lines of the liquid crystal display module is completed. Next, a next scanning period begins.

It should be appreciated that, the display driving method of the display device is described in the above by taking a case where the liquid crystal display module includes 400 rows of pixel units and there are four backlight modules, however, the quantity of rows of pixel units of the liquid crystal display module is not limited to 400, and the quantity of the backlight modules may be also not limited to four. In the present disclosure, the quantity of the backlight modules and the manner of the backlight module corresponding to pixel units are not particularly defined, and the above-mentioned display control method is still applied in different manners of the backlight module corresponding to pixel units, and which will not be particularly defined herein.

It should be appreciated that, according to a display principle of the display device without a color filter in the embodiments of the present disclosure, one scanning period refers to a process that all the scanning lines have been scanned. In one scanning period, although different backlight modules are driven to emit light in a time-division manner, the emitted light is in a same color. In different scanning periods, the backlight modules emit light in different colors sequentially.

In order to prevent the mismatch between the scanning of the scanning lines and the input of the backlight driving signal of the backlight module, e.g., the scanning of one scanning line is omitted, and the corresponding backlight module is turned on, optionally, a trigger signal for indicating that the scanning of one frame begins may be added. When the trigger signal is applied, it means that the scanning of a first scanning line of the liquid crystal display module begins, and a row scanning signal needs to be reset as starting from the first scanning line, so as to prevent an accumulation error. For example, in combination with FIGS.

1 and 2, during the image display, when the scanning of image data of each frame begins, the trigger signal is applied to the driving circuit 300, to enable the driving circuit 300 to determine that a scanning process starting from the first scanning line of the liquid crystal display module is currently required to be performed. Optionally, the trigger signal may be applied to the driving circuit 300 by the signal processor 400. In the display device of the embodiments of the present disclosure, for example, the case where the liquid crystal display module includes 400 rows of pixel units is still taken as an example, in the case that a display frequency required for the display device is 60 Hz, when the display device is applied to the color-filter-less display, a refresh frequency is 180 Hz, so as to sequentially output display images corresponding to R, G and B.

As shown in FIG. 3, in a refresh period of a conventional technique, the backlight module is turned on after all the scanning lines have been scanned, duration required for the refresh period is: T1+T2=1 s/180=5.5 ms. If a charging time period of scanning of each scanning line is 8us (a specific value needs to be determined according to a loading of a liquid crystal display panel) and a time period for the deflection of the liquid crystal molecule is 1 ms, the first time stage T1 in FIG. 3 is calculated as follows.

$T1=8$ us*400+1 ms (a time period for the deflection of the liquid crystal molecule in a last row)=4.2 ms.

The second time stage T2 is calculated as follows.

$T2=(5.5-4.2)$ ms=1.3 ms.

In the display device of the embodiments of the present disclosure, as shown in FIG. 9, a time stage TC is a sum of charging time periods of scanning lines in each pixel region, i.e., a time period where the corresponding backlight module is turned off. A time stage TL is a time period for deflection of the liquid crystal molecule and is another time period where the corresponding backlight module is turned off. Thus, the time period where each backlight module is turned off is a sum of TC and TL. The first time stage T1 is a sum of the charging time periods of 100 scanning lines and the time period for deflection of the liquid crystal molecule, and is calculated as follows.

$Tc+TL=8$ us*100+1 ms (a time period for the deflection of the liquid crystal molecule in a last row) =1.80 ms Then, in the case that one refresh period is 5.5 ms, a time period where the corresponding backlight module is turned on is 5.5 ms−1.80 ms=3.7 ms.

Apparently, in one refresh period, as compared with the case where the time period where the backlight module 100 is turned on is 1.3 ms in the related art, in the display device of the embodiments of the present disclosure, the time period where the backlight module is turned on is increased to 3.7 ms, so it is able to adequately improve the brightness.

In the embodiments of the present disclosure, optionally, the backlight driving signal is applied to the backlight module 100 after the display scanning signal has been applied to the scanning lines of the corresponding pixel units for preset duration, the preset duration is duration required for the deflection of a liquid crystal molecule.

Through increasing the duration required for the deflection of the liquid crystal molecule, it is able to ensure that the deflection of the liquid crystal molecule has been completed. Next, the backlight module is turned on, thereby to ensure the display effect, and avoid the crosstalk.

In a possible embodiment of the present disclosure, when applying the display scanning signal to the scanning lines of the array substrate sequentially and applying the backlight driving signal to the backlight module in accordance with the target image frame data, a display input period of the target image frame data includes a plurality of input procedures of applying the display scanning signal to the scanning lines of an array substrate sequentially, the plurality of backlight modules emit light in a same color within each input procedure, and emit light in different colors within different input procedures respectively.

In a possible embodiment of the present disclosure, after the backlight driving signal is applied to the corresponding backlight module, to enable the plurality of light sources in the backlight module to emit light in one of the colors, the method further includes: when applying the display scanning signal of a next procedure to the scanning lines of the corresponding pixel units, controlling the plurality of light sources in the corresponding backlight module to be turned off. That is, an ON time period for the plurality of light sources in the backlight module starts from a time point where light sources are turned on and ends when a display scanning signal of a next procedure is applied to the scanning lines corresponding to the pixel units, so as to provide the maximum ON time period.

Specifically, as shown in FIG. 9, in the case that red light sources of a first backlight module are turned on, after the scanning of scanning lines in other pixel regions has been completed, red light sources of the corresponding backlight modules are turned on sequentially. In the case that it is required to turn on red light sources of the backlight module in a next refresh period, the red light sources of the first backlight module are controlled to be turned off.

Therefore, as compared with the related art, after partial scanning lines have been scanned in one refresh period, the light sources of the backlight module are turned on, thereby to significantly improve the brightness of the display device.

Figure 10:
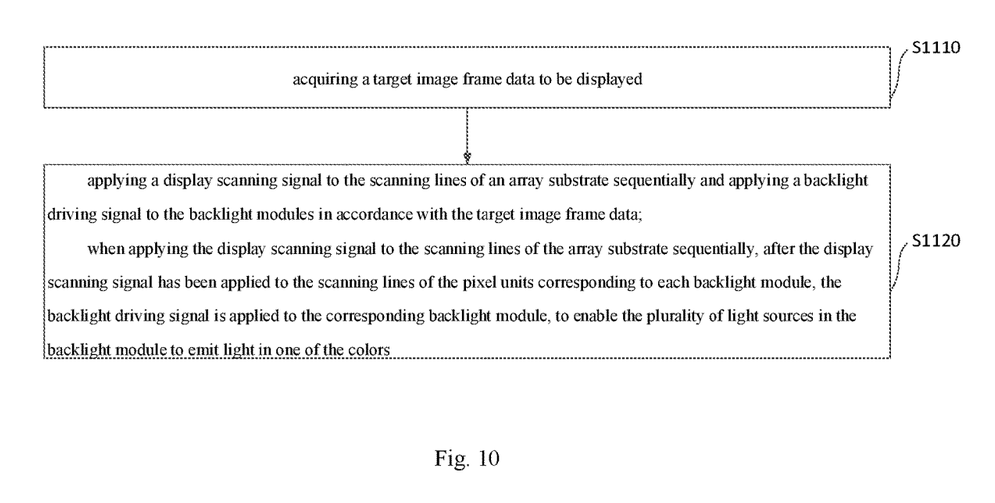
FIG. 10 is a flow chart of a display control method according to one embodiment of the present disclosure.

In the embodiments of the present disclosure, a display control method applied to the above-mentioned display device is further provided, as shown in FIG. 10, including the following steps.

S1110, acquiring a target image frame data to be displayed.

S1120, applying a display scanning signal to the scanning lines of an array substrate sequentially and applying a backlight driving signal to the backlight modules in accordance with the target image frame data.

When applying the display scanning signal to the scanning lines of the array substrate sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

In the display control method of the embodiments of the present disclosure, a plurality of backlight modules are provided, each backlight module is separately controlled via the driving circuit, and each backlight module corresponds to at least two rows of pixel units, where the pixel units in one row are along the length extension direction of each scanning line, so, when the display control is performed, after partial scanning lines have been scanned, the light sources of the backlight module are turned on. In other words, the scanning process and the light-emitting process of the light sources of the backlight module are performed in a stage-division and matching manner. As compared with the case where the light sources of the backlight module are energized after scanning the scanning lines of the entire liquid crystal display module, it is able to increase the effective light-emitting duration of the backlight module, and increase the brightness of the entire display device.

In a possible embodiment of the present disclosure, in S1120, the backlight driving signal is applied to the backlight module after the display scanning signal has been applied to the scanning lines of the corresponding pixel units for preset duration; where the preset duration is duration required for the deflection of a liquid crystal molecule.

In a possible embodiment of the present disclosure, in S1120, when applying the display scanning signal to the scanning lines of the array substrate sequentially and applying the backlight driving signal to the backlight module in accordance with the target image frame data, a display input period of the target image frame data includes a plurality of input procedures of applying the display scanning signal to the scanning lines of an array substrate sequentially, the plurality of backlight modules emit light in a same color within each input procedure, and emit light in different colors within different input procedures respectively.

In a possible embodiment of the present disclosure, in S1120, after the backlight driving signal is applied to the corresponding backlight module, to enable the plurality of light sources in the backlight module to emit light in one of the colors, the method further includes: when applying the display scanning signal of a next procedure to the scanning lines of the corresponding pixel units, controlling the plurality of light sources in the corresponding backlight module to be turned off.

In the embodiments of the present disclosure, a display control device applied to the above-mentioned display device is further provided, including: a data acquisition module, configured to acquire a target image frame data to be displayed, and a control module, configured to apply a display scanning signal to the scanning lines sequentially and apply a backlight driving signal to the backlight modules in accordance with the target image frame data. when applying the display scanning signal to the scanning lines sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

In a possible embodiment of the present disclosure, the control module is further configured to apply the backlight driving signal to the backlight module after the display scanning signal has been applied to the scanning lines of the corresponding pixel units for preset duration, where the preset duration is duration required for the deflection of a liquid crystal molecule.

In a possible embodiment of the present disclosure, when the control module applies the display scanning signal to the scanning lines of the array substrate sequentially and applying the backlight driving signal to the backlight module in accordance with the target image frame data, a display input period of the target image frame data includes a plurality of input procedures of applying the display scanning signal to the scanning lines of an array substrate sequentially, the plurality of backlight modules emit light in a same color within each input procedure, and emit light in different colors within different input procedures respectively.

In a possible embodiment of the present disclosure, after the control module applies the backlight driving signal to the corresponding backlight module, to enable the plurality of light sources in the backlight module to emit light in one of the colors, the control module is further configured to, when applying the display scanning signal of a next procedure to the scanning lines of the corresponding pixel units, control the plurality of light sources in the corresponding backlight module to be turned off.

In the embodiments of the present disclosure, modules, units or subunits may be implemented by software to be executed by various types of processors. For example, an identified executable code module may include one or more physical or logical blocks including computer instructions, which may be constructed as an object, process, or function, for example. However, an executable code of the identified module does not need to be physically located together, but may include different instructions stored in different locations that, in a case that the different instructions are logically combined, the instructions constitute the modules and achieve the specified purpose of the module.

A corresponding hardware circuit may be designed by a person skilled in the art to realize the modules, units or subunits, without considering a cost. The hardware circuit includes a conventional Very Large Scale Integrated (VLSI) circuit or a gate array and a related semiconductor such as a logic chip, a transistor, or other discrete elements. The module may also be implemented by a programmable hardware device, such as a Field Programmable Gate Array, a programmable array logic, a programmable logic device, and the like.

The above embodiments are optional embodiments of the present disclosure, it should be appreciated, those skilled in the art may make various improvements and modifications without departing from the principle of the present disclosure, and theses improvement and modifications shall fall within the protection scope of the present disclosure.

What is claimed is:
1. A display device, comprising:
a plurality of backlight modules, wherein each backlight module comprises a plurality of light sources capable of emitting light in at least three different colors;
a color-filter-less liquid crystal display module comprising a plurality of pixel units arranged in an array form and a plurality of scanning lines coupled to the pixel units, wherein the plurality of backlight modules are arranged in parallel with the liquid crystal display module, wherein an orthogonal projection of each backlight module onto a plane where the liquid crystal display module is located corresponds to at least two rows of pixel units, and wherein the pixel units in one row are along an length extension direction of each scanning line; and
a driving circuit coupled to each backlight module and configured to apply a backlight driving signal to each backlight module,
wherein each backlight module further comprises
a collimating structure configured to perform collimating calibration on the light emitted by the backlight module, wherein:
the collimating structure comprises a cup-shaped body disposed surrounding each light source, and an interior surface of the cup-shaped body is a reflective surface; and
the collimating structure further comprises a light shielding baffle plate disposed between two adjacent backlight modules, the light shielding baffle plate being higher than a plurality of pixel units.

2. The display device according to claim 1, wherein the plurality of backlight modules are arranged in a direction perpendicular to the length extension direction of the scanning line.

3. The display device according to claim 1, further comprising:
a signal processor, configured to output a control sequence where the light sources emit light in different colors,
wherein the driving circuit is coupled to the signal processor, and configured to apply the backlight driving signal to the backlight modules in accordance with the control sequence, to enable the plurality of light sources to emit light in a corresponding color.

4. The display device according to claim 1, wherein each backlight module further comprises:
signal lines corresponding to different colors of light, wherein the light sources in the backlight module emitting light in different colors are each coupled to the driving circuit via a corresponding signal line.

5. The display device according to claim 4, wherein the driving circuit comprises:
a driving chip, wherein each backlight module is coupled to the driving chip via the signal lines, and the driving chip is configured to apply the backlight driving signal to the coupled backlight module, and
wherein different backlight modules are coupled to one driving chip; or, different backlight modules are coupled to different driving chips respectively; or, there are at least two driving chips, and each driving chip is coupled to a part of the backlight modules.

6. The display device according to claim 4, wherein a switch element is arranged at each signal line; when the switch element is in an on state, the light source coupled to the signal line is electrically connected to a power source; when the switch element is in an off state, the light source coupled to the signal line is electrically disconnected from the power source;
wherein the driving circuit comprises:
a switch controller coupled to each switch element and configured to apply a switch control signal to the switch element to enable the switch element to switch between the on state and the off state, wherein the backlight driving signal is applied to different backlight modules via the switch control signal.

7. A display control device applied to the display device according to claim 1, comprising:
a data acquisition module, configured to acquire a target image frame data to be displayed; and
a control module, configured to apply a display scanning signal to the scanning lines sequentially and apply a backlight driving signal to the backlight modules in accordance with the target image frame data,
wherein when applying the display scanning signal to the scanning lines sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

8. The display control device according to claim 7, wherein the control module is further configured to apply the backlight driving signal to the backlight module after the display scanning signal has been applied to the scanning lines of the corresponding pixel units for a preset duration, and wherein the preset duration is duration required for the deflection of a liquid crystal molecular.

9. The display control device according to claim 7, wherein, when the control module applies the display scanning signal to the scanning lines of the array substrate sequentially and applying the backlight driving signal to the backlight module in accordance with the target image frame data, a display input period of the target image frame data comprises a plurality of input procedures of applying the display scanning signal to the scanning lines of an array substrate sequentially, the plurality of backlight modules emit light in a same color within each input procedure, and emit light in different colors within different input procedures respectively.

10. The display control device according to claim 7, wherein, after the control module applies the backlight driving signal to the corresponding backlight module, to enable the plurality of light sources in the backlight module to emit light in one of the colors, the control module is further configured to, when applying the display scanning signal of a next procedure to the scanning lines of the corresponding pixel units, control the plurality of light sources in the corresponding backlight module to be turned off.

11. A display control method applied to the display device according to claim 1, comprising:
acquiring a target image frame data to be displayed; and
applying a display scanning signal to the scanning lines sequentially and applying a backlight driving signal to the backlight modules in accordance with the target image frame data,
wherein when applying the display scanning signal to the scanning lines sequentially, after the display scanning signal has been applied to the scanning lines of the pixel units corresponding to each backlight module, the backlight driving signal is applied to the corresponding backlight module, to enable the plurality of light sources in the backlight module to emit light in one of the colors.

12. The display control method according to claim 11, wherein the backlight driving signal is applied to the backlight module after the display scanning signal has been applied to the scanning lines of the corresponding pixel units for a preset duration, and
wherein the preset duration is duration required for the deflection of a liquid crystal molecule.

13. The display control method according to claim 11, wherein when applying the display scanning signal to the scanning lines sequentially and applying the backlight driving signal to the backlight module in accordance with the target image frame data, a display input period of the target image frame data comprises a plurality of input procedures of applying the display scanning signal to the scanning lines of an array substrate sequentially, the plurality of backlight modules emit light in a same color within each input procedure, and emit light in different colors within different input procedures respectively.

14. The display control method according to claim 11, wherein after the backlight driving signal is applied to the corresponding backlight module, to enable the plurality of light sources in the backlight module to emit light in one of the colors, the method further comprises:
when applying the display scanning signal of a next procedure to the scanning lines of the corresponding pixel units, controlling the plurality of light sources in the corresponding backlight module to be turned off.

* * * * *